(12) United States Patent
Nam

(10) Patent No.: US 11,133,737 B2
(45) Date of Patent: Sep. 28, 2021

(54) ELECTRONIC CIRCUIT FOR COMPENSATING VOLTAGE BASED ON AUTO ZEROING OPERATION

(71) Applicant: Samsung Electronics Co., Ltd., Suwon-si (KR)

(72) Inventor: Hyunseok Nam, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/705,748

(22) Filed: Dec. 6, 2019

(65) Prior Publication Data

US 2020/0266695 A1 Aug. 20, 2020

(30) Foreign Application Priority Data

Feb. 15, 2019 (KR) .................. 10-2019-0017998

(51) Int. Cl.
*H02M 1/42* (2007.01)
*H02M 1/08* (2006.01)
*H02M 1/00* (2006.01)

(52) U.S. Cl.
CPC .............. *H02M 1/08* (2013.01); *H02M 1/42* (2013.01); *H02M 1/0003* (2021.05); *H02M 1/0083* (2021.05)

(58) Field of Classification Search
CPC ........ H02M 1/12; H02M 1/42; H02M 1/4225; H02M 1/4233; H02M 1/4241; H02M 1/4258; H02M 1/425; H02M 1/4208; G05F 1/10; G05F 1/267; G05F 1/46; G05F 1/561; G05F 1/567; G05F 1/569; G05F 1/571; G05F 1/573; G05F 1/5735; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 1/08; G05F 1/153; G05F 1/16; G05F 1/34; G05F 1/26; G05F 3/02; G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247;
(Continued)

(56) References Cited

U.S. PATENT DOCUMENTS

| 7,573,327 B1 * | 8/2009 | Pertijs ................. H03F 3/387 327/124 |
|---|---|---|
| 7,696,817 B1 | 4/2010 | Boucher et al. |
| 7,760,015 B2 | 7/2010 | Randlett |

(Continued)

*Primary Examiner* — Bryan R Perez
(74) *Attorney, Agent, or Firm* — Harness, Dickey & Pierce, P.L.C.

(57) ABSTRACT

In one embodiment, the electronic circuit includes a first amplifying circuit configured to generate a first compensation voltage based on a first reference voltage and an output voltage. The output voltage is from a functional circuit bloc. A second amplifying circuit is configured to generate a control voltage based on an input voltage, a second reference voltage and the first compensation voltage. The second reference voltage is different than the first reference voltage.

20 Claims, 11 Drawing Sheets

(58) Field of Classification Search
CPC ... G05F 3/26; G05F 3/265; G05F 3/24; G05F 3/262
See application file for complete search history.

(56) References Cited

U.S. PATENT DOCUMENTS

| | | | |
|---|---|---|---|
| 8,258,864 B1 | 9/2012 | Chan et al. | |
| 8,698,556 B2 | 4/2014 | Rosca | |
| 9,201,438 B2 | 12/2015 | MacLean et al. | |
| 9,641,075 B2 | 5/2017 | Beier et al. | |
| 9,685,913 B2 | 6/2017 | Quilligan et al. | |
| 2007/0242536 A1* | 10/2007 | Matsubara | G11C 7/14 |
| | | | 365/189.09 |
| 2011/0037520 A1* | 2/2011 | Choi | H03F 3/68 |
| | | | 330/295 |
| 2017/0331370 A1* | 11/2017 | Arbetter | H02M 1/08 |

* cited by examiner

Step 1

ELECTRONIC CIRCUIT FOR COMPENSATING VOLTAGE BASED ON AUTO ZEROING OPERATION

CROSS-REFERENCE TO RELATED APPLICATIONS

This application claims priority under 35 U.S.C. § 119 to Korean Patent Application No. 10-2019-0017998 filed on Feb. 15, 2019, in the Korean Intellectual Property Office, the disclosures of which are incorporated by reference herein in their entireties.

BACKGROUND

Embodiments of the inventive concepts described herein relate to an electronic circuit, and more particularly, relate to an electronic circuit configured to compensate a voltage that is output for an operation of an electronic device.

A mobile device such as a smartphone or a tablet personal computer (PC) is designed to have a small size for portability. The mobile device uses a power supply device, which may store only a limited power, such as a battery. The mobile device includes semiconductor devices that operate based on little power. The mobile device includes a power management integrated circuit (PMIC) for providing voltages for operations of the semiconductor devices.

A level of a voltage that is provided to a semiconductor device by the PMIC may include an error. A ratio of a magnitude of the error included in the voltage to the level of the voltage, that is, an error rate may increase as the level of the voltage decreases. Accordingly, as a level of a voltage that is desired to operate a semiconductor device becomes lower, an error rate of the voltage provided to the semiconductor device may increase.

The PMIC may include various electronic circuits for the purpose of generating a voltage having a low error rate. For example, an error may come from offset voltages of active elements included in an electronic circuit. The electronic circuit may perform various operations for canceling out the offset voltages generated by the active elements.

SUMMARY

At least one example embodiment relates to an electronic circuit.

In one embodiment, the electronic circuit includes a first amplifying circuit configured to generate a first compensation voltage based on a first reference voltage and an output voltage. The output voltage is from a functional circuit bloc. A second amplifying circuit is configured to generate a control voltage based on an input voltage, a second reference voltage and the first compensation voltage. The second reference voltage is different than the first reference voltage.

At least one example embodiment relates to an electronic device.

In one embodiment, the electronic device includes a functional circuit block configured to generate an output voltage based on a control voltage; and a compensation circuit configured to generate the control voltage. The compensation circuit includes a first amplifying circuit configured to generate a first compensation voltage based on a first reference voltage and an output voltage. The output voltage is from a functional circuit block. The compensation circuit also includes a second amplifying circuit configured to generate a control voltage based on an input voltage, a second reference voltage and the first compensation voltage. The second reference voltage is different than the first reference voltage.

At least one example embodiment relates to a power management integrated circuit.

In one embodiment, a power management integrated circuit includes a power voltage generating circuit configured to generate an output voltage based on a power reference voltage and a control voltage; and a compensation circuit configured to generate the control voltage. The compensation circuit includes a first amplifying circuit configured to generate a first compensation voltage based on a first reference voltage and an output voltage. The output voltage is from a functional circuit block. The compensation circuit also includes a second amplifying circuit configured to generate a control voltage based on an input voltage, a second reference voltage and the first compensation voltage.

At least one embodiment relates to a method.

In one embodiment, the method includes generating a first compensation voltage based on a first reference voltage and an output voltage. The output voltage is from a functional circuit block. The method further includes generating a control voltage based on an input voltage, a second reference voltage and the first compensation voltage, the second reference voltage being different than the first reference voltage.

At least one embodiment is related to a method of operating an electronic circuit including first and second amplifying circuits.

In one embodiment, the method of operating an electronic circuit including first and second amplifying circuits includes, in a first operation, applying an output voltage to a non-inverting terminal and an inverting terminal of the second amplifying circuit, applying a first reference voltage to a null non-inverting terminal of the second amplifying circuit, and connecting an output of the second amplifying circuit to a null inverting terminal of the second amplifying circuit. In a second operation, the method includes applying the output voltage to the inverting terminal of the second amplifying circuit, applying a second reference voltage to non-inverting terminal of the second amplifying circuit, disconnecting the output of the second amplifying circuit from a null inverting terminal of the second amplifying circuit, applying the output of the second amplifying circuit to a null non-inverting terminal of the first amplifying circuit, applying an input voltage to an inverting terminal of the first amplifying circuit, and applying a third reference voltage to a non-inverting terminal of the first amplifying circuit.

At least one embodiment relates to a power management method.

In one embodiment the power management method includes generating an output voltage based on a power reference voltage and a control voltage; generating a first compensation voltage based on a first reference voltage and the output voltage; and generating the control voltage based on an input voltage, a second reference voltage and the first compensation voltage. The second reference voltage is different than the first reference voltage.

At least one embodiment relates to an electronic circuit.

In one embodiment, the electronic circuit includes a first amplifying circuit configured to generate a first compensation voltage based on a first reference voltage and an output voltage. The output voltage is from a functional circuit block. A second amplifying circuit is configured to generate a control voltage based on an input voltage, a second reference voltage and the first compensation voltage. The second reference voltage is different than the first reference voltage; and wherein the first amplifying circuit is configured to receive the first reference voltage at a first non-inverting terminal, and receive the output voltage at a first inverting terminal; the second amplifying circuit is configured to receive the second reference voltage at a second non-inverting terminal, and receive the input voltage at a second inverting terminal; the first amplifying circuit includes a first null non-inverting terminal and a first null inverting terminal, and the first amplifying circuit is configured to receive a third reference voltage at the first null non-inverting terminal; and the second amplifying circuit includes a second null non-inverting terminal and a second null inverting terminal, and the second amplifying circuit is configured to receive the first compensation voltage at the second null non-inverting terminal, and receive a fourth reference voltage at the second null inverting terminal, and the fourth reference voltage is same as the third reference voltage.

In another embodiment, the electronic circuit includes a first amplifying circuit configured to generate a first compensation voltage based on a first reference voltage and an output voltage. The output voltage is from a functional circuit block. A second amplifying circuit is configured to generate a control voltage based on an input voltage, a second reference voltage and the first compensation voltage. The second reference voltage is different than the first reference voltage. A switching architecture is configured to, in a first operation, apply the output voltage to a non-inverting terminal and an inverting terminal of the first amplifying circuit, apply a third reference voltage to the null non-inverting terminal of the first amplifying circuit, and connect an output of the first amplifying circuit to a null inverting terminal of the second amplifying circuit. The switching architecture is configured to, in a second operation, apply the output voltage to the inverting terminal of the first amplifying circuit, apply the first reference voltage to the non-inverting terminal of the first amplifying circuit, disconnect the output of the first amplifying circuit from the null inverting terminal of the first amplifying circuit, apply the output of the first amplifying circuit to a null non-inverting terminal of the second amplifying circuit, and apply a fourth reference voltage to the null inverting terminal of the second amplifying circuit. The electronic circuit further includes a first charge storing circuit connected to the null non-inverting terminal of the second amplifying circuit; a second charge storing circuit connected to the null inverting terminal of the second amplifying circuit; a third charge storing circuit connected to the null non-inverting terminal of the first amplifying circuit; a fourth charge storing circuit connected to the null inverting terminal of the first amplifying circuit; a first divider circuit configured to divide the first reference voltage by a first ratio to obtain the second reference voltage; and a second divider circuit configured to divide the output voltage by a second ratio to obtain the input voltage, the first ratio is same as the second ratio.

BRIEF DESCRIPTION OF THE FIGURES

The above and other objects and features of the inventive concept will become apparent by describing in detail example embodiments thereof with reference to the accompanying drawings.

DETAILED DESCRIPTION

Below, some embodiments of the inventive concepts may be described in detail and clearly to such an extent that an ordinary one in the art easily implements the inventive concept. For better understanding, in this specification, a level of a voltage may be expressed by using a symbol of the voltage. For example, a level of a voltage Vx may be referred to "Vx".

Figure 1:
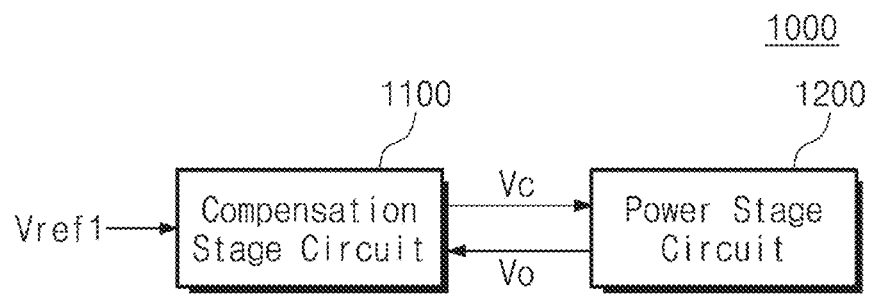
FIG. 1 is a circuit diagram illustrating an electronic circuit according to an embodiment of the inventive concepts.

FIG. 1 is a circuit diagram illustrating an electronic circuit according to an embodiment of the inventive concepts.

Referring to FIG. 1, an electronic circuit 1000 may include a compensation circuit 1100 and a power stage circuit 1200. The electronic circuit 1000 may be included in an electronic device. For example, the electronic circuit 1000 may be included in a PMIC of an electronic device (refer to FIG. 12). For example, the electronic circuit 1000 may be a converting circuit such as at least one of a buck converter, a boost converter, a buck-boost converter, and/or a low dropout (LDO) regulator, which are used to convert a voltage.

The compensation stage circuit 1100 may receive a voltage Vo from the power stage circuit 1200. The compensation stage circuit 1100 may receive a reference voltage Vref1 from the outside of the electronic circuit 1000. For example, the compensation stage circuit 1100 may receive the reference voltage Vref1 from a reference voltage generator that is placed outside the electronic circuit 1000. The reference voltage Vref1 may be a voltage that is generated to have a characteristic of a high process/voltage/temperature (PVT) variation.

The reference voltage Vref1 may be used as a reference voltage that the power stage circuit 1200 uses to generate the voltage Vo. For example, the power stage circuit 1200 may be configured to generate the voltage Vo having a level corresponding to a level of the reference voltage Vref1, based on the reference voltage Vref1.

For example, the electronic circuit 1000 may output the voltage Vo to any other component (e.g., a processor, a buffer memory, or a nonvolatile memory) of an electronic device including the electronic circuit 1000. The component may require voltage of a specific level (hereinafter referred to as an "operating level") for a stable operation. The electronic circuit 1000 may be configured to output the voltage Vo having the operating level, based on the reference voltage Vref1 having a level corresponding to the operating level, for the purpose of providing an voltage of the operating level to a component.

The compensation stage circuit 1100 may generate a voltage Vc to be used to compensate the voltage Vo, based on the voltage Vo and the reference voltage Vref1. For example, the compensation stage circuit 1100 may generate the voltage Vc based on a difference between the voltage Vo and the reference voltage Vref1. The compensation stage circuit 1100 may output the voltage Vc to the power stage circuit 1200. A configuration and operations of the compensation stage circuit 1100 will be described with reference to FIGS. 2 to 11.

The power stage circuit 1200 may generate the voltage Vo based on the voltage Vc. For example, the power stage circuit 1200 may receive a reference voltage from the outside of the electronic circuit 1000. The power stage circuit 1200 may receive the voltage Vc from the compensation stage circuit 1100. The power stage circuit 1200 may generate the voltage Vo based on the reference voltage and the voltage Vc. For example, the power stage circuit 1200 may use the voltage Vc for the purpose of compensating the voltage Vo that is generated based on the reference voltage.

In detail, a level of the voltage Vc may correspond to a difference between a level of the voltage Vo and the level of the reference voltage Vref1. The power stage circuit 1200 may perform various operations for reducing a difference between the level of the voltage Vo and the level of the reference voltage Vref1, based on the level of the voltage Vc. The power stage circuit 1200 may adjust the level of the voltage Vo based on the voltage Vc. For example, the power stage circuit 1200 may include a push-pull stage configuration for the purpose of adjusting the level of the voltage Vo based on the voltage Vc.

Figure 2:
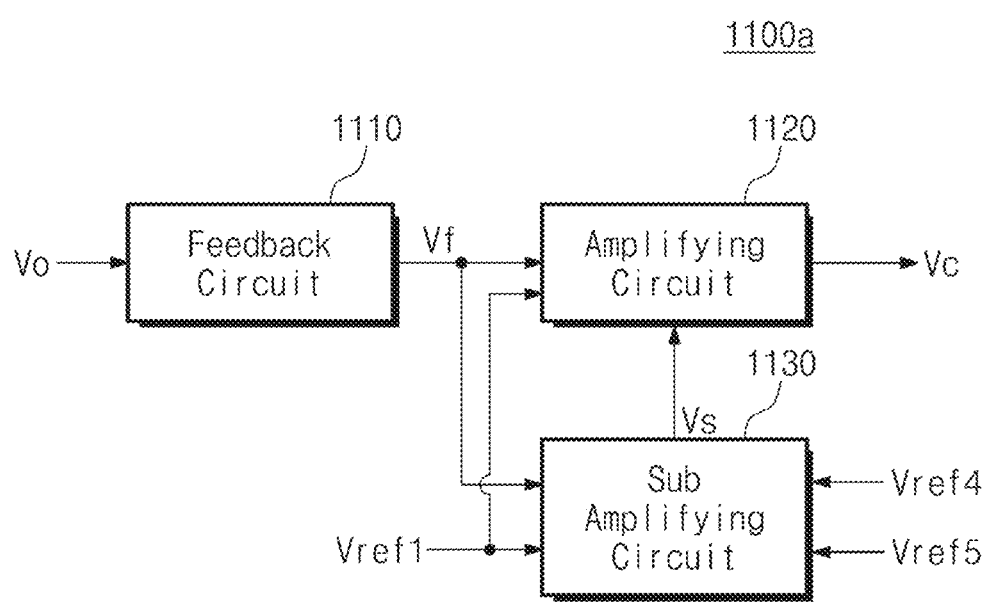
FIGS. 2 and 3 are circuit diagrams illustrating example configurations of a compensation stage circuit of FIG. 1.

FIG. 2 is a circuit diagram illustrating an example configuration of a compensation stage circuit of FIG. 1.

The compensation stage circuit 1100 of FIG. 1 may include a compensation circuit 1100*a* of FIG. 2. Referring to FIG. 2, the compensation stage circuit 1100*a* may include a feedback circuit 1110, an amplifying circuit 1120, and a sub-amplifying circuit 1130.

The feedback circuit 1110 may receive the voltage Vo from the power stage circuit 1200. The feedback circuit 1110 may output a voltage Vf based on the voltage Vo. The feedback circuit 1110 may divide the voltage Vo to output the voltage Vf. A level of the voltage Vf and a level of the voltage Vo may have a specific ratio that is determined by the feedback circuit 1110. For example, the feedback circuit 1110 may output the voltage Vf that is obtained by dividing the voltage Vo by using resistors connected in series to each other. The feedback circuit 1110 may output the voltage Vf to the amplifying circuit 1120 and the sub-amplifying circuit 1130.

The amplifying circuit 1120 may receive the voltage Vf from the feedback circuit 1110. The amplifying circuit 1120 may receive a voltage Vs from the sub-amplifying circuit 1130. The amplifying circuit 1120 may generate the voltage Vc based on the voltage Vf, a reference voltage Vref1, and the voltage Vs. For example, the amplifying circuit 1120 may generate the voltage Vc, which relates to a level associated with a difference between a level of the voltage Vo and a level of the reference voltage Vref1, based on the voltage Vf, the reference voltage Vref1, and the voltage Vs. The reference voltage Vref1 may be supplied by an external control circuit, and may be a design parameter set through empirical study.

For example, the amplifying circuit 1120 may include an active element such as an operational amplifier. The active element may generate an offset voltage. The amplifying circuit 1120 may operate based on a voltage having a level corresponding to a sum of a level of the voltage Vf and a level of the offset voltage. Accordingly, the level of the voltage Vc may include an error that is generated by the offset voltage. The amplifying circuit 1120 may perform operations for reducing the error generated by the offset voltage by canceling out the offset voltage based on the voltage Vs.

The sub-amplifying circuit 1130 may receive the voltage Vf from the feedback circuit 1110. As described with reference to FIG. 1, the sub-amplifying circuit 1130 may receive the reference voltage Vref1 from a reference voltage generator that is placed outside the electronic circuit 1000. The sub-amplifying circuit 1130 may also receive reference voltages Vref4 and Vref5 for an operation of the sub-amplifying circuit 1130 from the reference voltage generator that is placed outside the electronic circuit 1000.

For example, the sub-amplifying circuit 1130 may include an active element such as an operational amplifier. The active element may generate an offset voltage. The sub-amplifying circuit 1130 may perform operations for canceling out the offset voltage. The reference voltages Vref4 and Vref5 may be used to decrease levels of offset voltages.

For example, the active element of the sub-amplifying circuit 1130 may operate based on a direct current (DC) voltage having the operating level. The levels of the reference voltages Vref4 and Vref5 may be associated with a level of the DC voltage. For example, the levels of the reference voltages Vref4 and Vref5 may be equal and half the operating level (0.5 times). However, the reference voltages Vref4 and Vref5 are not limited to this. The reference voltages Vref4 and Vref5 may be supplied by an external control circuit, and are design parameters that may be set through empirical study.

The sub-amplifying circuit 1130 may generate the voltage Vs (referred to as a compensation voltage) to be used to cancel out an offset voltage generated by the amplifying circuit 1120, based on the reference voltages Vref1, Vref4, and Vref5 and the voltage Vf. For example, the sub-amplifying circuit 1130 may be configured to perform an auto zeroing operation based on the reference voltages Vref1, Vref4, and Vref5 and the voltage Vf.

One voltage Vs is illustrated in FIG. 2, but the voltage Vs may include one or more voltages, which will be described with reference to FIG. 4. An example configuration and example operations of the sub-amplifying circuit 1130 will be described with reference to FIGS. 5 to 9.

Figure 3:
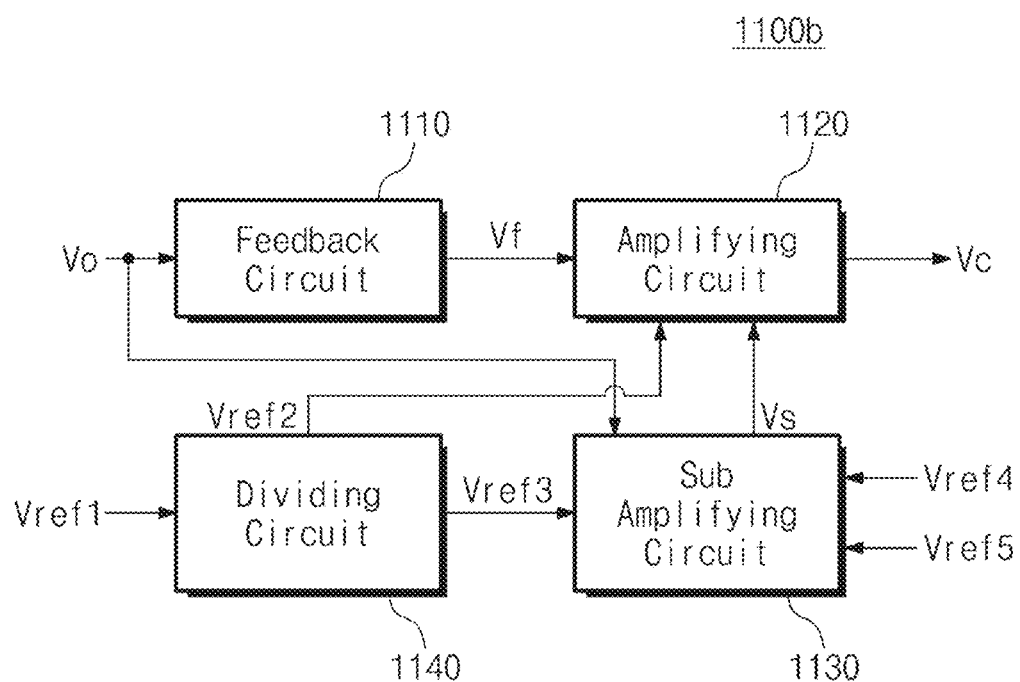

FIG. 3 is a circuit diagram illustrating an example configuration of a compensation stage circuit of FIG. 1.

The compensation stage circuit 1100 of FIG. 1 may include a compensation circuit 1100*b* of FIG. 3. Compared with the compensation stage circuit 1100*a* of FIG. 2, the compensation stage circuit 1100*b* of FIG. 3 may further include a dividing circuit 1140. The dividing circuit 1140 may generate reference voltages Vref2 and Vref3 based on the reference voltage Vref1.

For example, the dividing circuit 1140 may generate the reference voltages Vref2 and Vref3, each of which has a level of a given ratio to the level of the reference voltage Vref1. The dividing circuit 1140 may output the reference voltage Vref2 to the amplifying circuit 1120 and may output the reference voltage Vref3 to the sub-amplifying circuit 1130.

The dividing circuit 1140 may receive the reference voltage Vref1 from the reference voltage generator that is placed outside the electronic circuit 1000. The dividing circuit 1140 may output the reference voltages Vref2 and Vref3 based on the reference voltage Vref1. The dividing circuit 1140 may divide the reference voltage Vref1 to output the reference voltages Vref2 and Vref3. A level of the reference voltage Vref1 and levels of the reference voltages Vref2 and Vref3 may respectively have specific ratios that are determined by the dividing circuit 1140.

For example, the dividing circuit 1140 may output the reference voltage Vref2 that is obtained by dividing the reference voltage Vref1 by using resistors connected in series to each other; the dividing circuit 1140 may pass the reference voltage Vref1 to output substantially the same reference voltage Vref3 as the reference voltage Vref1. The dividing circuit 1140 may output the reference voltages Vref2 and Vref3 to the amplifying circuit 1120 and the sub-amplifying circuit 1130, respectively.

Compared with the amplifying circuit 1120 of FIG. 2, the amplifying circuit 1120 of FIG. 3 may receive the reference voltage Vref2 instead of the reference voltage Vref1. The amplifying circuit 1120 may operate based on the reference voltage Vref2 instead of the reference voltage Vref1. The sub-amplifying circuit 1130 may receive the reference voltage Vref3 and the voltage Vo instead of the reference voltage Vref1 and the voltage Vf. The sub-amplifying circuit 1130 may operate based on the reference voltage Vref3 and the voltage Vo instead of the reference voltage Vref1 and the voltage Vf.

Because the voltage Vf is generated based on the voltage Vo, the voltage Vf may correspond to the voltage Vo; because the reference voltages Vref2 and Vref3 are generated based on the reference voltage Vref1, the reference voltages Vref2 and Vref3 may correspond to the reference voltage Vref1. Accordingly, the operations of the feedback circuit 1110, the amplifying circuit 1120, and the sub-amplifying circuit 1130 of FIG. 3 are the same as or similar to the operations of the feedback circuit 1110, the amplifying circuit 1120, and the sub-amplifying circuit 1130 described with reference to FIG. 2, and thus, additional description will be omitted to avoid redundancy.

Below, the amplifying circuit 1120 included in the compensation stage circuit 1100b of FIG. 3 will be described with reference to FIG. 4, and the sub-amplifying circuit 1130 included in the compensation stage circuit 1100b of FIG. 3 will be described with reference to FIGS. 5 to 9. Configurations and operations of the amplifying circuit 1120 and the sub-amplifying circuit 1130 of FIG. 3 are similar to the configurations and operations of the amplifying circuit 1120 and the sub-amplifying circuit 1130 included in the compensation stage circuit 1100a of FIG. 2, and thus, additional description will be omitted to avoid redundancy.

Figure 4:
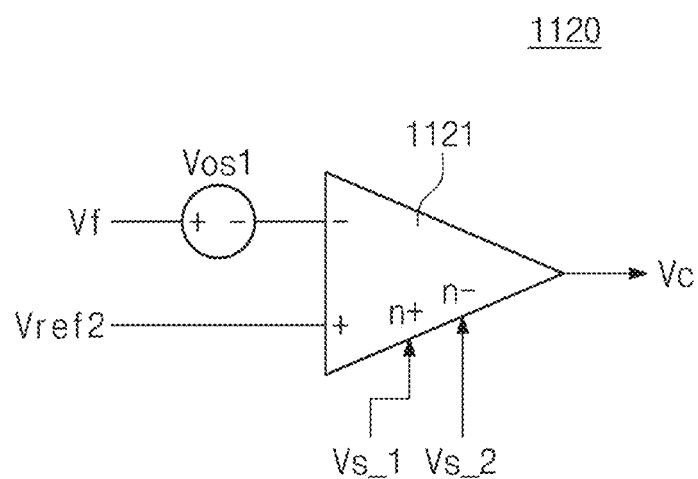
FIG. 4 is a circuit diagram illustrating an example configuration of an amplifying circuit of FIG. 3.

FIG. 4 is a circuit diagram illustrating an example configuration of an amplifying circuit of FIG. 3.

Referring to FIG. 4, the amplifying circuit 1120 may include an operational amplifier 1121. The voltage Vs of FIG. 3 may include voltages Vs_1 and Vs_2 of FIG. 4. For better understanding, an example manufacturing error voltage is illustrated in FIG. 4 as an offset voltage Vos1 generated by a separate voltage source, but it should be understood that the offset voltage Vos1 is generated by an operation of the operational amplifier 1121. For example, the offset voltage Vos1 may be generated in an operation of the operational amplifier 1121 due to an error that occurs in the process of manufacturing the operational amplifier 1121.

The operational amplifier 1121 may receive the voltage Vf from the feedback circuit 1110 through an inverting terminal. The operational amplifier 1121 may receive the reference voltage Vref2 from the dividing circuit 1140 through a non-inverting terminal. The operational amplifier 1121 may receive the voltage Vs_1 from the sub-amplifying circuit 1130 through a null non-inverting terminal. The operational amplifier 1121 may receive the voltage Vs_2 from the sub-amplifying circuit 1130 through a null inverting terminal.

The operational amplifier 1121 may generate the voltage Vc based on the voltages Vf, Vs_1, and Vs_2, and the reference voltage Vref2. For example, the operational amplifier 1121 may output the voltage Vc based on a difference between a level of the voltage Vf and a level of the reference voltage Vref2 and may perform auto zeroing operations for canceling out the offset voltage Vos1 based on the voltages Vs_1 and Vs_2. Accordingly, voltages Vs_1 and Vs_2 may be referred to as first and second compensation voltages.

In detail, the operational amplifier 1121 may amplify the difference between the level of the voltage Vf and the level of the reference voltage Vref2 (i.e., may multiply a gain and the difference together) and may generate a voltage to be used to output the voltage Vc. However, in practice, because the operational amplifier 1121 receives a voltage of "Vf−Vos1" including the offset voltage Vos1, the voltage Vc may include a component of the offset voltage Vos1. For example, the operational amplifier 1121 may generate a voltage of "A11*(Vref2−Vf+Vos1)" (here, "A11" being a gain for an inverting/non-inverting terminal of the operational amplifier 1121).

The operational amplifier 1121 may cancel out the offset voltage Vos1 based on the voltages Vs_1 and Vs_2 associated with the offset voltage Vos1. As the offset voltage Vos1 is canceled out based on the voltages Vs_1 and Vs_2, a magnitude of the component of the offset voltage Vos1 included in the voltage Vc may decrease. For example, the voltage Vs_2 may be a DC voltage for an operation of the operational amplifier 1121. Accordingly, the operational amplifier 1121 may generate a voltage of "(Vs_1−Vs_2)*A12" (here, "A12" being a gain for a null inverting/null non-inverting terminal of the operational amplifier 1121).

The operational amplifier 1121 may output the voltage Vc of "A11*(Vref2−Vf+Vos1)−(Vs_1−Vs_2)*A12", based on the voltage of "A11*(Vref2−Vf+Vos1)" generated based on voltages input to the inverting and non-inverting terminals and the voltage of "(Vs_1−Vs_2)*A12" generated based on voltages input to the null inverting terminal and the null non-inverting terminal. The voltage Vs_1 may have a level suitable for the auto zeroing operation associated with the offset voltage Vos1 by the sub-amplifying circuit 1130, which will be described with reference to FIGS. 6 to 9. Operations of the operational amplifier 1121 for outputting the voltage Vc based on the voltage Vs_1 will be more fully described with reference to FIG. 11.

Figure 5:
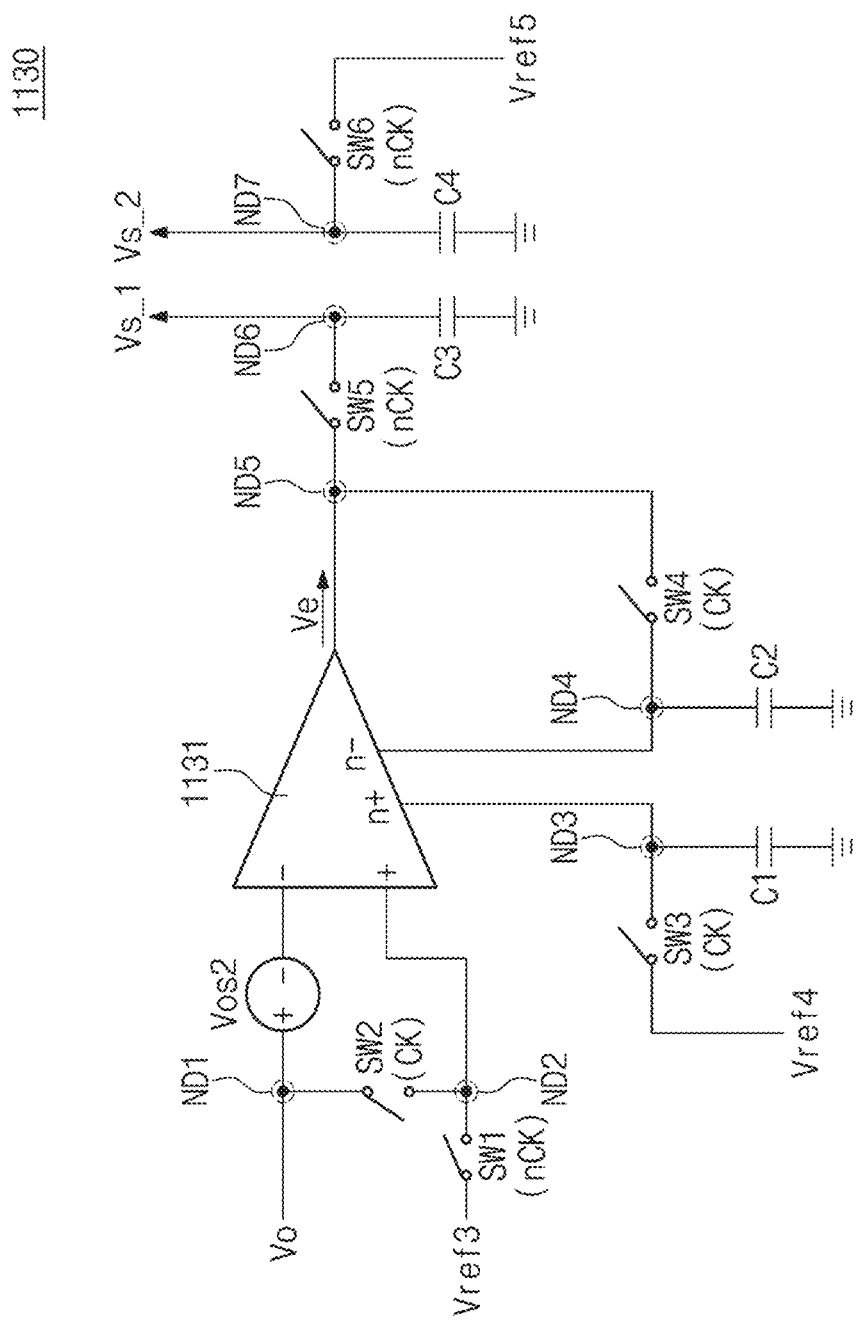
FIG. 5 is a circuit diagram illustrating an example configuration of a sub-amplifying circuit of FIG. 3.

FIG. 5 is a circuit diagram illustrating an example configuration of a sub-amplifying circuit of FIG. 3.

Referring to FIG. 5, the sub-amplifying circuit 1130 may include an operational amplifier 1131, switches SW1 to SW6, and capacitive elements C1 to C4. For better understanding, an example manufacturing error voltage is illustrated in FIG. 5 as an offset voltage Vos2 generated by a separate voltage source, but it should be understood that the offset voltage Vos2 is generated by an operation of the operational amplifier 1131. For example, the offset voltage Vos2 may be generated in an operation of the operational amplifier 1131 due to an error that occurs in the process of manufacturing the operational amplifier 1131.

An inverting terminal of the operational amplifier 1131 may be connected with a node ND1. The voltage Vo may be input to the node ND1 from the power stage circuit 1200. The operational amplifier 1131 may receive the voltage Vo from the node ND1 through the inverting terminal. A non-inverting terminal of the operational amplifier 1131 may be connected with a node ND2.

The switch SW1 may control a connection between the dividing circuit 1140 and the node ND2. The operational amplifier 1131 may receive the reference voltage Vref3 from the dividing circuit 1140 through the switch SW1, the node ND2, and the non-inverting terminal. The switch SW2 may control connection between the node ND1 and the node ND2.

A null non-inverting terminal of the operational amplifier 1131 may be connected with a node ND3. The capacitive element C1 may be connected between the node ND3 and a ground terminal. The switch SW3 may control a connection between a terminal, to which the reference voltage Vref4 is supplied, and the node ND3. The operational amplifier 1131 may receive the reference voltage Vref4 through the switch SW3, the node ND3, and the null non-inverting terminal.

A null inverting terminal of the operational amplifier 1131 may be connected with a node ND4. The capacitive element C2 may be connected between the node ND4 and the ground terminal. The switch SW4 may control connection between the node ND4 and a node ND5. The node ND5 may be connected with an output terminal of the operational amplifier 1131. The operational amplifier 1131 may output a voltage Ve to the node ND5.

The switch SW5 may control connection between the node ND5 and a node ND6. The capacitive element C3 may be connected between the node ND6 and the ground terminal. The switch SW6 may be connected between a terminal, to which the reference voltage Vref5 is supplied, and a node ND7. The capacitive element C4 may be connected between the node ND7 and the ground terminal. The voltage Vs_1 of the node ND6 and the voltage Vs_2 of the node ND7 may be output to the amplifying circuit 1120 as the voltage Vs of the sub-amplifying circuit 1130.

The sub-amplifying circuit 1130 may receive a clock CK and a clock nCK from a clock generator that is placed inside/outside the electronic circuit 1000. A phase of the clock CK and a phase of the clock nCK may be complementary. The switches SW2, SW3, and SW4 may operate based on the clock CK. The switches SW1, SW5, and SW6 may operate based on the clock nCK.

Operations of the operational amplifier 1131 are the same as or similar to the operations of the operational amplifier 1121 described with reference to FIG. 4, and thus, additional description will be omitted to avoid redundancy. Accordingly, the voltage Ve output from the operational amplifier 1131 may include the offset voltage Vos2. The operational amplifier 1131 may receive voltages associated with the offset voltage Vos2 from the nodes ND3 and ND4, which will be described with reference to FIGS. 6 and 7. The operational amplifier 1131 may cancel out the offset voltage Vos1 based on voltages received from the nodes ND3 and ND4. As the offset voltage Vos1 is canceled out, a magnitude of a component of the offset voltage Vos1 included in the voltage Vc may decrease. Example operations of the sub-amplifying circuit 1130 will be described with reference to FIGS. 6 to 9.

Figure 6:
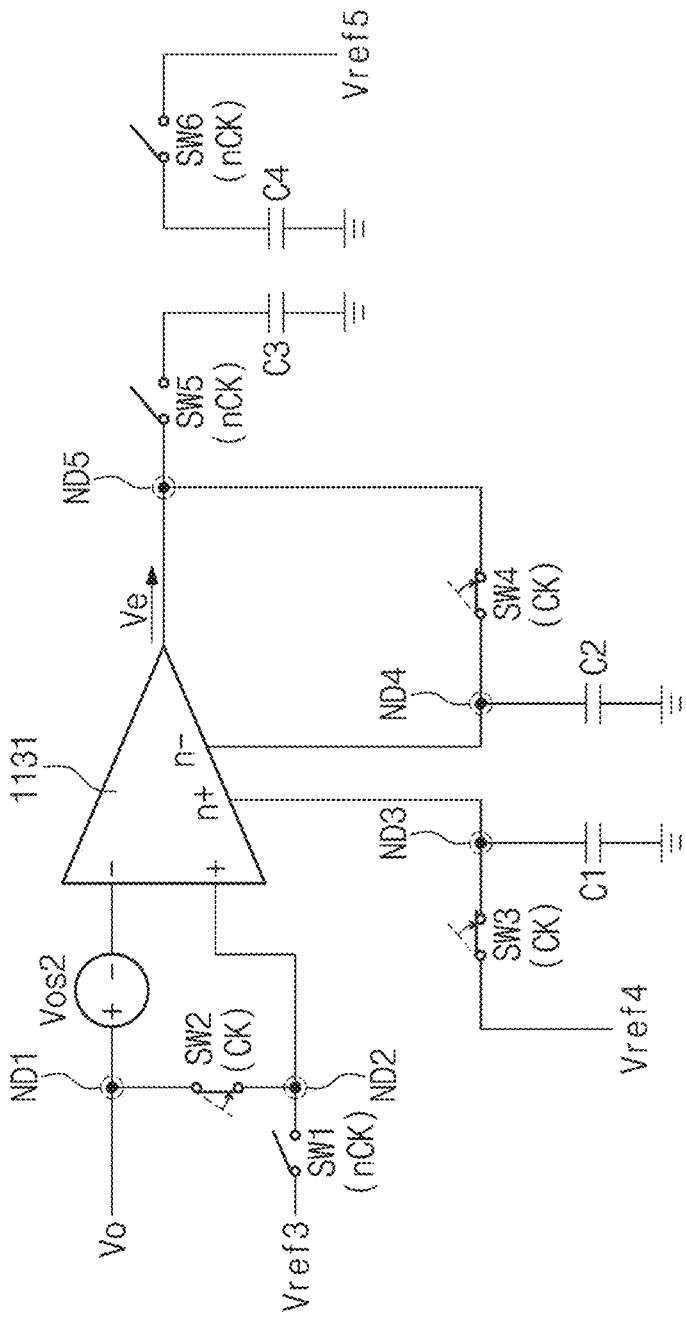
FIG. 6 is a circuit diagram illustrating example operations of switches of FIG. 5.

FIG. 6 is a circuit diagram illustrating example operations of switches of FIG. 5.

Below, an auto zeroing operation for the offset voltage Vos2 of the operational amplifier 1131 will be described with reference to FIGS. 6 and 7. Operations of a first step "Step 1" that are performed by the sub-amplifying circuit 1130 will be described with reference to FIG. 6. The switches SW2, SW3, and SW4 may be turned on in response to the clock CK. The switch SW2 may connect the node ND1 and the node ND2. The switch SW3 may connect the terminal, to which the reference voltage Vref4 is supplied, and the node ND3. The switch SW4 may connect the node ND4 and the node ND5.

As described with reference to FIG. 5, the phase of the clock CK and the phase of the clock nCK may be complementary. The switches SW1, SW5, and SW6 may be turned off in response to the clock nCK. The switch SW1 may disconnect the terminal, to which the reference voltage Vref3 is supplied, from the node ND2. The switch SW5 may disconnect the node ND5 from the capacitive element C3. The switch SW6 may disconnect the terminal, to which the reference voltage Vref5 is supplied, from the capacitive element C4.

Figure 7:
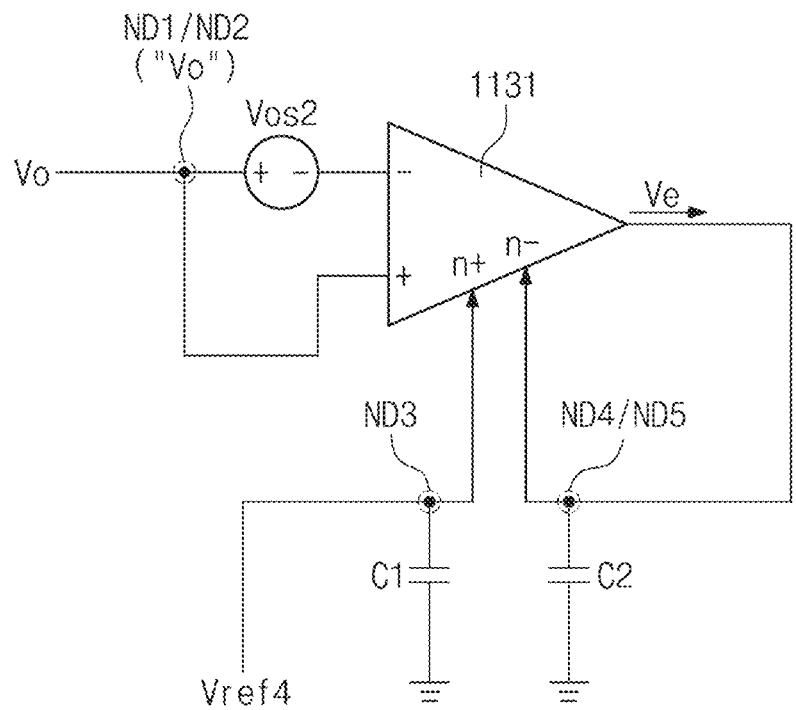
FIG. 7 is a circuit diagram illustrating an equivalent circuit of a sub-amplifying circuit of FIG. 6, which is formed according to operations of FIG. 6.

FIG. 7 is a circuit diagram illustrating an equivalent circuit of a sub-amplifying circuit of FIG. 6, which is formed according to operations of FIG. 6.

Operations of a second step "Step 2" that are performed by the sub-amplifying circuit 1130 will be described with reference to FIG. 7. As the node ND1 and the node ND2 are connected by the switch SW2, the node ND1 and the node ND2 may be illustrated as one node ND1/ND2 in the equivalent circuit of FIG. 7. As the node ND4 and the node ND5 are connected by the switch SW4, the node ND4 and the node ND5 may be illustrated as one node ND4/ND5 in the equivalent circuit of FIG. 7.

The voltage Vo may be input to the node ND1/ND2 from the power stage circuit 1200. A voltage of "Vo" may be set to the node ND1/ND2. The voltage Vo may be input to the inverting terminal of the operational amplifier 1131 through the node ND1/ND2. A level of the voltage received through the inverting terminal of the operational amplifier 1131 may be offset "Vo−Vos2" by the offset voltage Vos2 of the operational amplifier 1131. The voltage Vo may be input to the non-inverting terminal of the operational amplifier 1131.

The reference voltage Vref4 may be input to the node ND3. The node ND3 may be set to a voltage of "Vref4". The voltage Vref4 may be input to the null non-inverting terminal of the operational amplifier 1131 through the node ND3. The capacitive element C1 may be charged by the voltage of "Vref4" on the node ND3. Accordingly, energy corresponding to the level "Vref4" of the voltage Vref4 may be stored in the capacitive element C1.

As the node ND4 and the node ND5 are connected by the switch SW4, the output terminal and the null inverting terminal of the operational amplifier 1131 may be connected. Accordingly, the operational amplifier 1131 may operate as a buffer. This may mean that the voltage of "Vref4" is transferred from the node ND3 to the node ND4/ND5 by the operational amplifier 1131.

Also, in the operational amplifier 1131, a voltage having a level of "Vos" being a difference between a level "Vo" of a voltage received through the non-inverting terminal and a level "Vo−Vos2" of a voltage received through the inverting terminal may be provided as an input of the operational amplifier 1131. Accordingly, the operational amplifier 1131 may generate a voltage of "(Vos2*A21)/(1+A22)" through the output terminal based on a voltage having the level of "Vos" (here, "A21" being a gain for an inverting/non-inverting terminal of the operational amplifier 1131 and "A22" being a gain for a null inverting/null non-inverting terminal of the operational amplifier 1131).

Accordingly, a voltage of "(Vos2*A21)/(1+A22)+Vref4" may be set to the node ND4/ND5. The capacitive element C2 may be charged by the voltage of "(Vos2*A21)/(1+A22)+Vref4" set to the node ND4/ND5. Accordingly, energy corresponding to the level "(Vos2*A21)/(1+A22)+Vref4" set to the node ND4/ND5 may be stored in the capacitive element C2.

Figure 8:
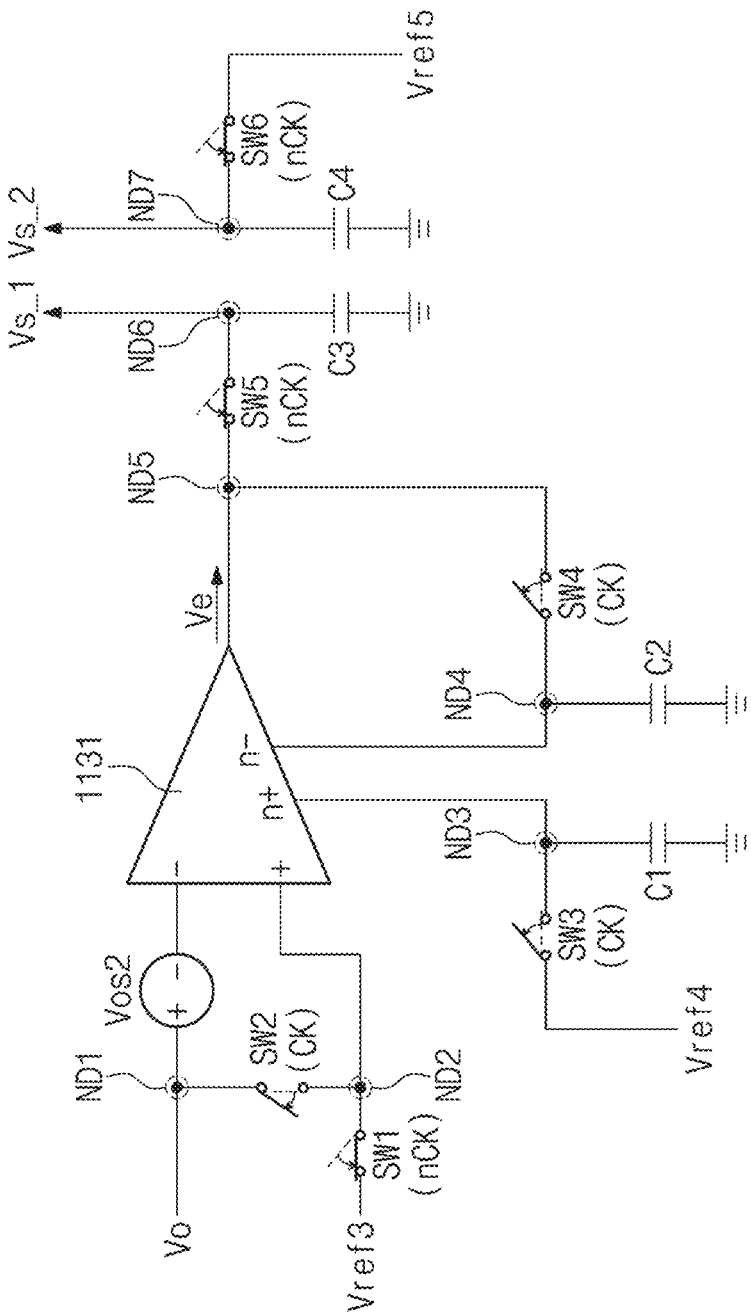
FIG. 8 is a circuit diagram illustrating example operations of switches of FIG. 5.

FIG. 8 is a circuit diagram illustrating example operations of switches of FIG. 5.

Below, an auto zeroing operation for the offset voltage Vos1 of the operational amplifier 1121 will be described with reference to FIGS. 8 and 9. Operations of a third step "Step 3" that are performed by the sub-amplifying circuit 1130 will be described with reference to FIG. 8. The switches SW2, SW3, and SW4 may be turned off in response to the clock CK. The switch SW2 may disconnect the node ND1 from the node ND2. The switch SW3 may disconnect the terminal, to which the reference voltage Vref4 is supplied, from the node ND3. The switch SW4 may disconnect the node ND4 from the node ND5.

As described with reference to FIG. 5, the phase of the clock CK and the phase of the clock nCK may be complementary. The switches SW1, SW5, and SW6 may be turned on in response to the clock nCK. The switch SW1 may connect a terminal, to which the reference voltage Vref3 is supplied, and the node ND2. The switch SW5 may connect the node ND5 and the capacitive element C3. The switch SW6 may connect a terminal, to which the reference voltage Vref5 is supplied, from the capacitive element C4.

Figure 9:
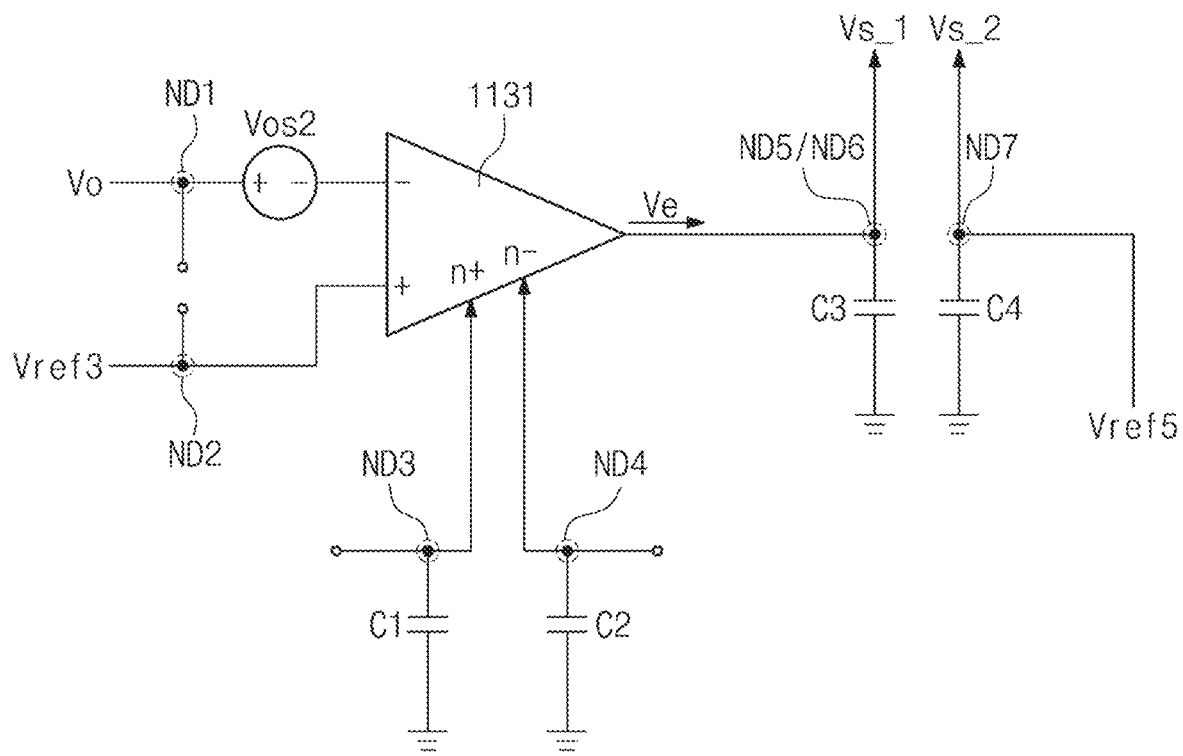
FIG. 9 is a circuit diagram illustrating an equivalent circuit of a sub-amplifying circuit of FIG. 8, which is formed according to operations of FIG. 8.

FIG. 9 is a circuit diagram illustrating an equivalent circuit of a sub-amplifying circuit of FIG. 8, which is formed according to operations of FIG. 8.

Operations of a fourth step "Step 4" that are performed by the sub-amplifying circuit 1130 will be described with reference to FIG. 9. As the node ND5 and the node ND6 are connected by the switch SW5, the node ND5 and the node ND6 may be illustrated as one node ND5/ND6 in the equivalent circuit of FIG. 9.

The voltage Vo may be input to the node ND1 from the power stage circuit 1200. A voltage of "Vo" may be set to the node ND1. The voltage Vo may be input to the inverting terminal of the operational amplifier 1131 through the node ND1. A level of the voltage Vo received through the inverting terminal of the operational amplifier 1131 may be offset "Vo−Vos2" by the offset voltage Vos2 of the operational amplifier 1131. The reference voltage Vref3 may be input to the node ND2. A voltage of "Vref3" may be set to the node ND2. The reference voltage Vref3 may be input to the non-inverting terminal of the operational amplifier 1131 through the node ND2.

The level "Vref4" of the voltage set to the node ND3 and the level "(Vos2*A21)/(1+A22)+Vref4" of the voltage set to the node ND4 may be maintained by the energy stored in the capacitive elements C1 and C2 in the operation of the second step "Step 2". The voltage of "Vref4" may be provided to the null non-inverting terminal of the operational amplifier 1131 by the capacitive element C1, and the voltage of "(Vos2*A21)/(1+A22)+Vref4" may be provided to the null inverting terminal of the operational amplifier 1131 by the capacitive element C2.

The operational amplifier 1131 may output the voltage Ve, based on the voltage of "Vo−Vos2" received through the inverting terminal, the voltage of "Vref3" received through the non-inverting terminal, the voltage of "Vref4" received through the null non-inverting terminal, and the voltage of "(Vos2*A21)/(1+A22)+Vref4" received through the null inverting terminal.

For example, the operational amplifier 1131 may amplify a difference between "Vo−Vos2" and "Vref3" (i.e., may multiply the difference between "Vo−Vos2" and "Vref3" and the gain A21 of the operational amplifier 1131 together) and may generate the voltage of "(Vref3−Vo+Vos2)*A21". The operational amplifier 1131 may output the voltage of "(Vos2*A21*A22)/(1+A22)", based on the voltage of "Vref4" received through the null non-inverting terminal and the voltage of "(Vos2*A21)/(1+A22)+Vref4" received through the null inverting terminal.

Accordingly, the operational amplifier 1131 may output the voltage Ve of "(Vref3−Vo+Vos2)*A21−(Vos2*A21*A22)/(1+A22)−Vref4" based on the voltage of "(Vref3−Vo+Vos2)*A21" and the voltage of "(Vos2*A21*A22)/(1+A22)−Vref4". Accordingly, in the case where the gains "A21" and "A22" of the operational amplifier 1131 are sufficiently great, a level of the voltage Ve may be approximate to "(Vref3−Vo)*A21−Vref4". That is, in the case where the gains "A21" and "A22" are sufficiently great, a magnitude of a component of the offset voltage Vos2 included in the level of the voltage Ve may be sufficiently small. For convenience of description, an example is described above as the voltage Ve of "(Vref3−Vo)*A21−Vref4" is output from the operational amplifier 1131.

The voltage Ve may be input to the node ND5/ND6. The voltage of "(Vref3−Vo)*A21−Vref4" may be set to the node ND5/ND6. The capacitive element C3 may be charged by the voltage of "(Vref3−Vo)*A21−Vref4" set to the node ND5/ND6. Accordingly, energy corresponding to the level "(Vref3−Vo)*A21" set to the node ND5/ND6 may be stored in the capacitive element C3. The voltage of "(Vref3−Vo)*A21−Vref4" set to the node ND5/ND6 may be provided to the amplifying circuit 1120 as the voltage Vs_1.

The reference voltage Vref5 may be input to the node ND7. A voltage of "Vref5" may be set to the node ND7. The capacitive element C4 may be charged by the voltage of "Vref5" set to the node ND7. Accordingly, energy corresponding to the level "Vref5" set to the node ND7 may be stored in the capacitive element C4. The voltage of "Vref5" set to the node ND7 may be provided to the amplifying circuit 1120 as the voltage Vs_2. As discussed previously, Vref4 may equal Vref5, such that the voltage Vs_1 may be "(Vref3−Vo)*A21−Vref5".

The operations of the first to fourth steps Step 1 to Step 4 described with reference to FIGS. 6 to 9 may be performed sequentially and repeatedly. For example, the operations of the first and second steps Step 1 and Step 2 may be respectively performed during a first time period to a fourth time period. The first time period to the fourth time period may arrive sequentially.

Figure 10:
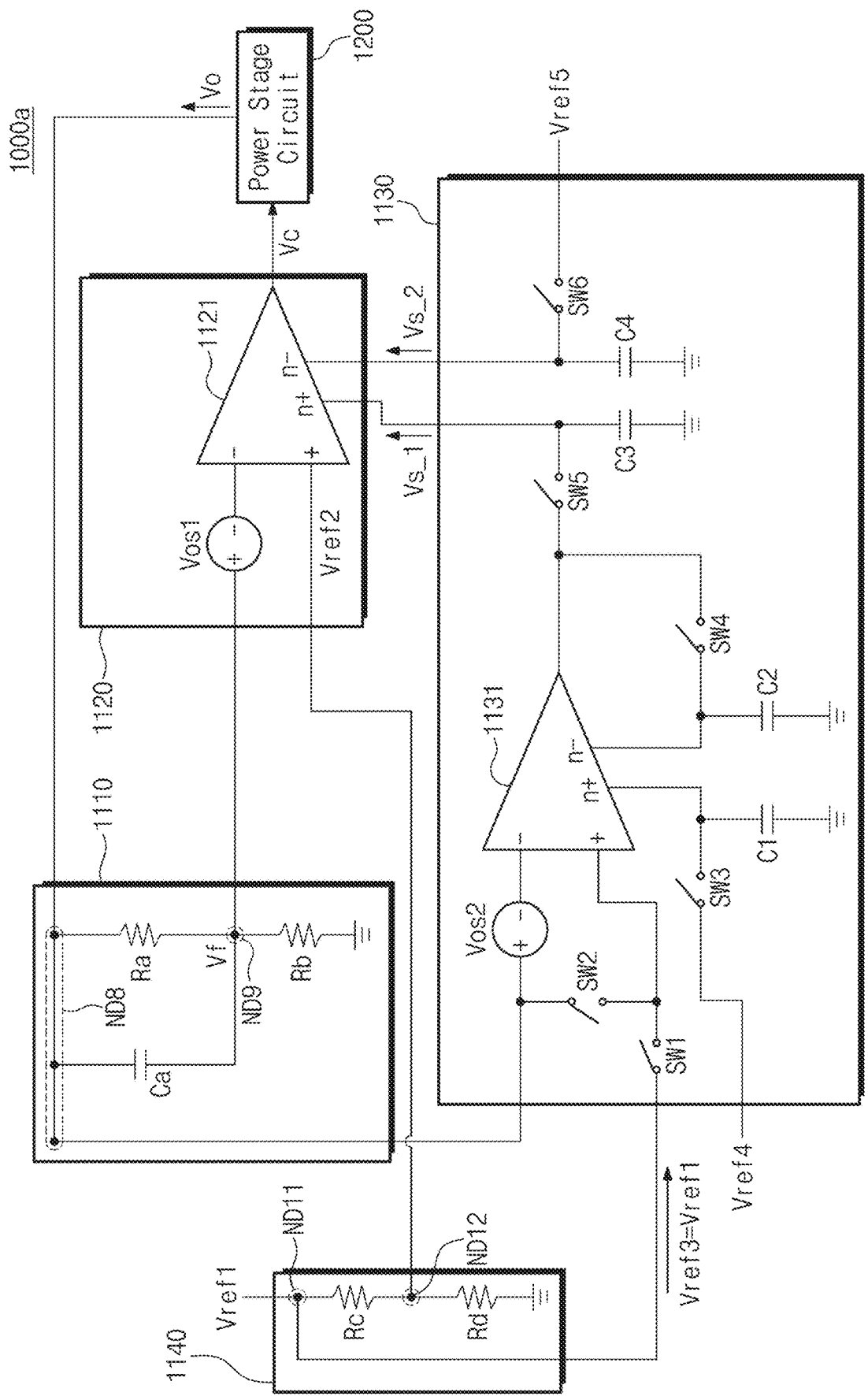
FIG. 10 is a circuit diagram illustrating an example configuration of an electronic circuit of FIG. 1 including a compensation stage circuit of FIG. 3.

FIG. 10 is a circuit diagram illustrating an example configuration of an electronic circuit of FIG. 1 including the compensation stage circuit of FIG. 3.

Referring to FIG. 10, an electronic circuit 1000a may include the feedback circuit 1110, the amplifying circuit 1120, the sub-amplifying circuit 1130, the dividing circuit 1140, and the power stage circuit 1200. The example configuration and the example operations of the amplifying circuit 1120 are described with reference to the embodiment of FIG. 4, and thus, additional description will be omitted to avoid redundancy. The example configuration and the example operations of the sub-amplifying circuit 1130 are described with reference to the embodiment of FIGS. 5 to 9, and thus, additional description will be omitted to avoid redundancy.

The feedback circuit 1110 may include resistors Ra and Rb and a capacitive element Ca. The feedback circuit 1110 may receive the voltage Vo from the power stage circuit 1200 through a node ND8. The capacitive element Ca may be connected between the node ND8 and a node ND9. The resistor Ra may be connected between the node ND8 and the node ND9. The resistor Rb may be connected between the node ND9 and the ground terminal.

The capacitive element Ca may provide a feedback path for the voltage Vo. The capacitive element Ca may be associated with a characteristic of a loop that is composed of the power stage circuit 1200, the feedback circuit 1110, the amplifying circuit 1120, and the sub-amplifying circuit 1130. For example, a pole and/or a zero of the loop may be formed according to a capacitance of the capacitive element Ca.

As the voltage Vo is divided by the resistors Ra and Rb, the voltage Vf may be set to the node ND9. Accordingly, a ratio between resistances of the resistors Ra and Rb may correspond to a ratio between a level of the voltage Vo and a level of the voltage Vf. For example, the level of the voltage Vf may be "Vo*(Rb/(Ra+Rb))" (here, "Vo" being the level of the voltage Vo, "Ra" being a resistance of the resistor Ra, and "Rb" being a resistance of the resistor Rb). The voltage Vf set to the node ND9 may be provided to the amplifying circuit 1120.

The example configuration and the example operations of the amplifying circuit 1120 are described with reference to the embodiment of FIG. 4, and thus, additional description will be omitted to avoid redundancy. The example configuration and the example operations of the sub-amplifying circuit 1130 are described with reference to the embodiment of FIGS. 5 to 9, and thus, additional description will be omitted to avoid redundancy.

The dividing circuit 1140 may include resistors Rc and Rd. The reference voltage Vref1 may be received through a node ND11. The resistor Rc may be connected between the node ND11 and a node ND12. The resistor Rd may be connected between the node ND12 and the ground terminal. A voltage that is set to the node ND12 may be provided to the operational amplifier 1121 of the amplifying circuit 1120 as the reference voltage Vref2. The dividing circuit 1140 may bypass the reference voltage Vref1 input to the node ND11 to the sub-amplifying circuit 1130. Accordingly, the reference voltage Vref1 input to the node ND11 may be provided to the sub-amplifying circuit 1130 as the reference voltage Vref3.

As the reference voltage Vref1 is divided by the resistors Rc and Rd, the reference voltage Vref2 may be set to the node ND12. Accordingly, a ratio between resistances of the resistors Rc and Rd may correspond to a ratio between a level of the reference voltage Vref1 and a level of the reference voltage Vref2. For example, a level of the reference voltage Vref2 may be "Vref1*(Rd/(Rc+Rd))" (here, "Vref1" being the level of the reference voltage Vref1, "Rc" being a resistance of the resistor Rc, and "Rd" being a resistance of the resistor Rd).

The resistances of the resistors Rc and Rd may be associated with (e.g., be the same or proportion to) the resistances of the resistors Ra and Rb. Accordingly, a ratio between the resistances of the resistors Ra and Rb may correspond to a ratio between the resistances of the resistors Rc and Rd. Accordingly, the voltage Vo and the reference voltage Vref1 may be scaled according to substantially the same ratio by the feedback circuit 1110 and the dividing circuit 1140.

As described with reference to FIGS. 6 to 9, the voltages Vs_1 and Vs_2 may include a component of the offset voltage Vos2. As described with reference to FIG. 4, the operational amplifier 1121 may output the voltage Vc of "A11*(Vref2−Vf+Vos1)−Vs_1*A12" based on the voltage Vs_1. Accordingly, the operational amplifier 1121 may output the voltage Vc of "A11*(Vref2−Vf+Vos1)+A12*A21*(Vref3−Vo)", based on the voltage Vs_1 of "(Vref3−Vo)*A21−Vref5" and the voltage Vs_2 of "Vref5".

Because a ratio of the reference voltage Vref3 to the reference voltage Vref2 is substantially the same as a ratio of the voltage Vo to the voltage Vf, "Vref2−Vf" may approximate to "K*(Vref3−Vo)" (here, "K" being a proportional constant). Accordingly, the voltage Vc may have a level of "(K*A11+A12*A21)*(Vref3−Vo)+A1*Vos1". In the case where "A11+A12*A21" is sufficiently greater than "A11", a level of the voltage Vc may approximate to "(K*A11+A12*A21)*(Vref3−Vo)". That is, a component of the offset voltage Vos1 included in the voltage Vc may be sufficiently small.

The sub-amplifying circuit 1130 of FIG. 10 may operate based on the voltage Vo directly received from the power stage circuit 1200. A level of the voltage Vo may be stably maintained by the power stage circuit 1200. Accordingly, even though a switching noise occurring in the sub-amplifying circuit 1130 is not circuited through a separate buffer, the level of the voltage Vo may be maintained stably.

The electronic circuit 1000a of FIG. 10 does not include a buffer. The electronic circuit 1000a, therefore does not generate an offset voltage due to a separate buffer. The voltage Vc that is output by the amplifying circuit 1120 of the electronic circuit 1000a may not include an offset component. Accordingly, the level of the voltage Vc may not include an error that comes from an offset component of a buffer.

The power stage circuit 1200 may generate the voltage Vo based on the voltage Vc. For example, the power stage circuit 1200 may compensate for an error included in the level of the voltage Vc for the level of the reference voltage Vref1 by adjusting the level of the voltage Vo based on the voltage Vc.

Figure 11:
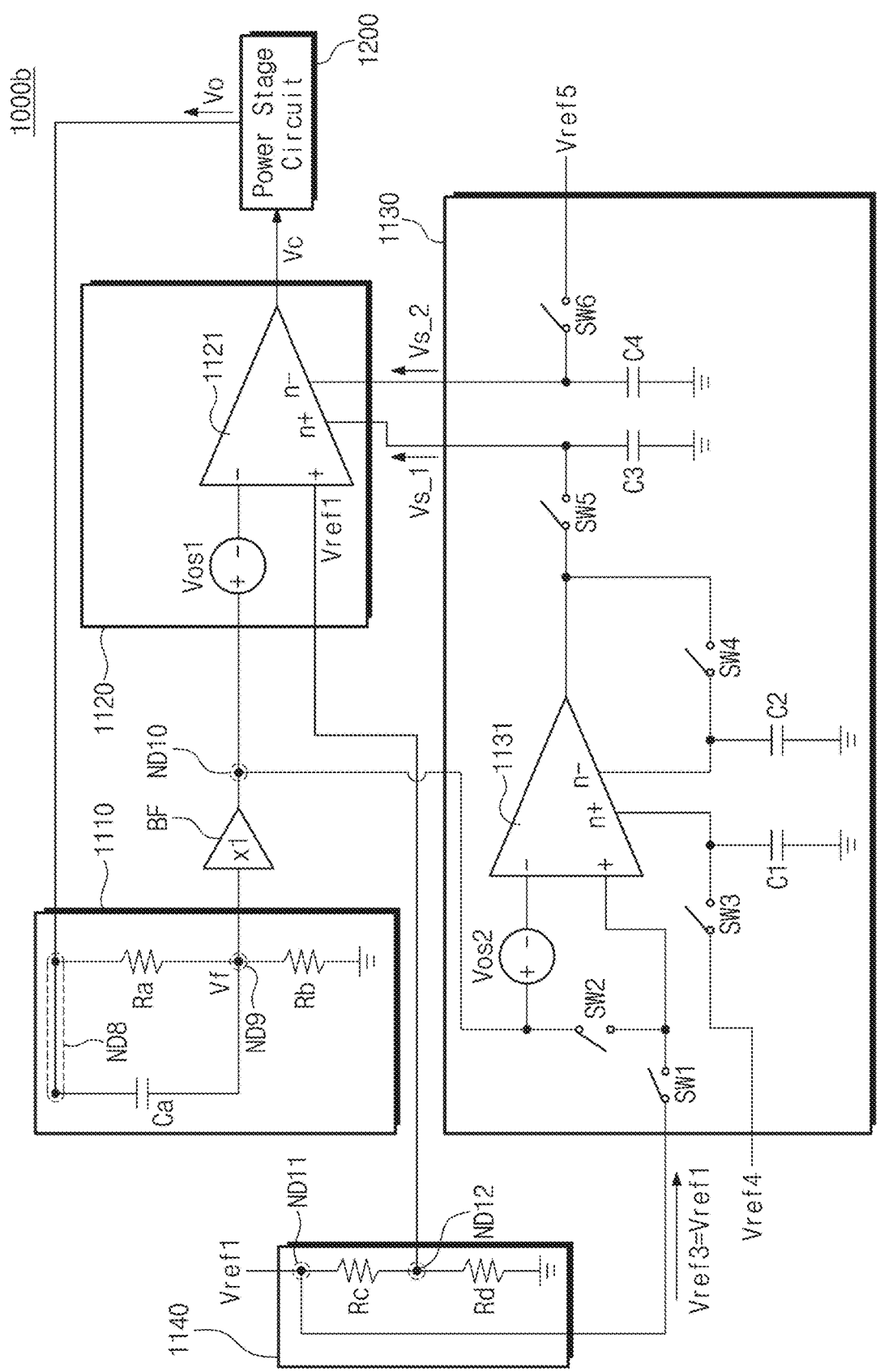
FIG. 11 is a circuit diagram illustrating another example configuration of an electronic circuit of FIG. 1 including a compensation stage circuit of FIG. 3.

FIG. 11 is a circuit diagram illustrating another example configuration of an electronic circuit of FIG. 1 including a compensation stage circuit of FIG. 3.

Referring to FIG. 11, an electronic circuit 1000b may be the same and operate the same as the embodiment of FIG. 10, except that the node ND9 may be connected with a buffer BF and the output of the buffer BF (voltage Vf) is supplied to both the amplifying circuit 1120 and the sub-amplifying circuit 1130. Accordingly, only these differences will be described.

The buffer BF may be connected between the node ND9 and a node ND10. The buffer BF may transfer the voltage Vf, which is set to the node ND9, to the node ND10. The operational amplifier 1121 of the amplifying circuit 1120 may be connected with the node ND10. The switch SW2 and the operational amplifier 1131 of the sub-amplifying circuit 1130 may be connected with the node ND10.

As described with reference to FIGS. 6 to 9, the sub-amplifying circuit 1130 may perform the auto zeroing operation. The auto zeroing operation may include operations by the switches SW1 to SW6. Accordingly, the auto zeroing operation may cause a switching noise of the sub-amplifying circuit 1130.

The buffer BF may circuit the switching noise transferred from the sub-amplifying circuit 1130 through the node ND10. Accordingly, the switching noise may not be transferred to the node ND9, and a level of the voltage Vf may be maintained stably. Afterwards, the amplifying circuit 1120 may stably operate based on the voltage Vf having the stably maintained level.

The voltage Vf set to the node ND9 may be provided to the amplifying circuit 1120 and the sub-amplifying circuit 1130 through the buffer BF.

The buffer BF of FIG. 11 may include at least one active element (e.g., an operational amplifier). An offset voltage may be generated by the active element included in the buffer BF. Due to the offset voltage generated by the active element of the buffer BF, the voltage Vc that is output by the amplifying circuit 1120 of the electronic circuit 1000a may include an offset component. Accordingly, the level of the voltage Vc may include an error that comes from the offset component of the buffer BF.

Figure 12:
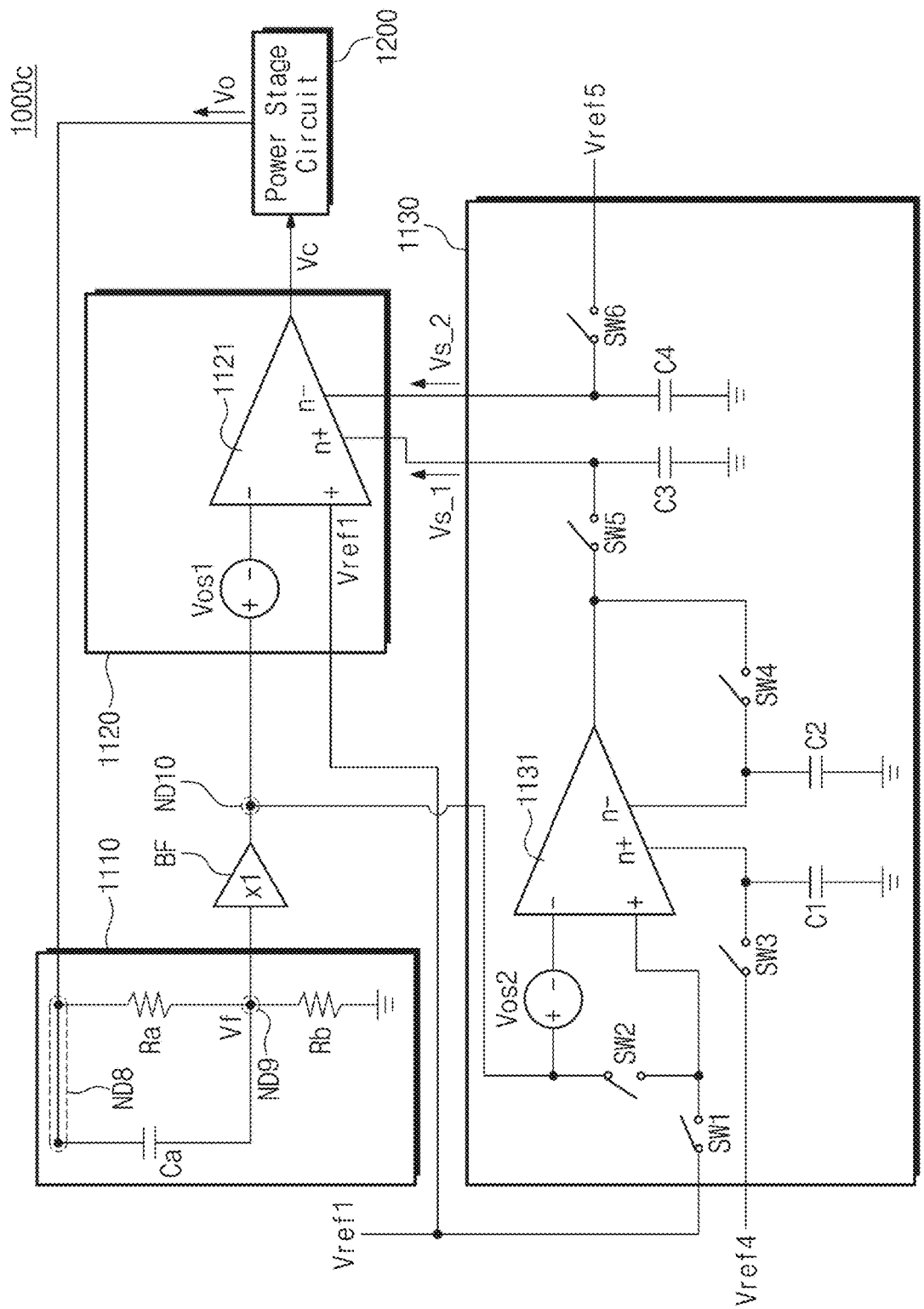
FIG. 12 is a circuit diagram illustrating an example configuration of an electronic circuit of FIG. 1 including a compensation stage circuit of FIG. 2.

FIG. 12 is a circuit diagram illustrating another example configuration of an electronic circuit of FIG. 1 including a compensation stage circuit of FIG. 2.

Referring to FIG. 12, an electronic circuit 1000c may be the same and operate the same as the embodiment of FIG. 11, except that the dividing circuit 1140 has been eliminated, and the first reference voltage Vref1 is supplied to both the amplifying circuit 1120 and the sub-amplifying circuit 1130.

Figure 13:
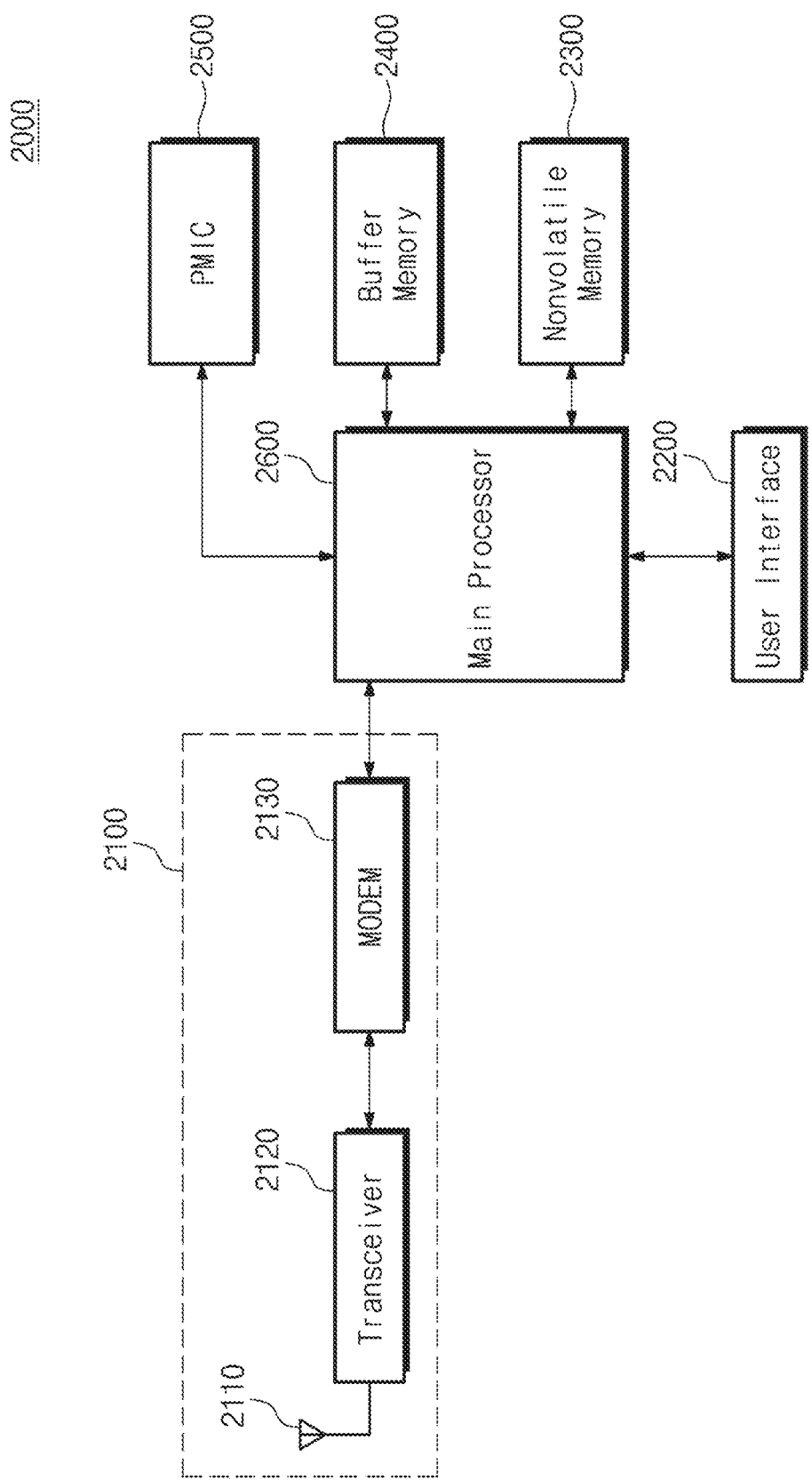
FIG. 13 is a circuit diagram illustrating an example configuration of an electronic device including an electronic circuit of FIG. 1.

FIG. 13 is a circuit diagram illustrating an example configuration of an electronic device including an electronic circuit of FIG. 1.

An electronic device 2000 may include a communication circuit 2100, a user interface 2200, a nonvolatile memory 2300, a buffer memory 2400, a PMIC 2500, and a main processor 2600. However, components of the electronic device 2000 are not limited to the embodiment of FIG. 13. The electronic device 2000 may not include one or more of the components illustrated in FIG. 12 or may further include at least one component not illustrated in FIG. 13.

The communication circuit 2100 may include an antenna 2110, a transceiver 2120, and a modulator/demodulator (MODEM) 2130. The communication circuit 2100 may exchange signals with an external device/system through the antenna 2110. The MODEM 2130 may convert a signal received through the antenna 2110. For example, the transceiver 2120 and the MODEM 2130 of the communication circuit 2100 may process signals, which are exchanged with the external device/system, in compliance with one or more wireless communication protocols.

The user interface 2200 may arbitrate communication between a user and the electronic device 2000. The user may input commands to the electronic device 2000 through the user interface 2200. The electronic device 2000 may provide the user with information generated by the main processor 2600 through the user interface 2200.

The nonvolatile memory 2300 may store data regardless of power supply. For example, the nonvolatile memory 2300 may include at least one of various nonvolatile memories such as a flash memory, a PRAM, an MRAM, a ReRAM, and a FRAM. For example, the nonvolatile memory 2300 may include a removable memory such as a hard disk drive (HDD), a solid state drive (SSD), or a secure digital (SD) card, and/or an embedded memory such as an embedded multimedia card (eMMC).

The buffer memory 2400 may store data that are used for an operation of the electronic device 2000. For example, the buffer memory 2400 may temporarily store data processed or to be processed by the main processor 2600. For example, the buffer memory 2400 may include a volatile memory, such as a static random access memory (SRAM), a dynamic RAM (DRAM), or a synchronous DRAM (SDRAM), and/or a nonvolatile memory, such as a flash memory, a phase-change RAM (PRAM), a magnetoresistive RAM (MRAM), a resistive RAM (ReRAM), or a ferroelectric RAM (FRAM).

The PMIC 2500 may power the components of the electronic device 2000. The PMIC 2500 may appropriately convert a power received from a battery and/or an external power source and may transfer the converted power to the components of the electronic device 2000. The PMIC 2500 may include at least one of the electronic circuit 1000 of FIG. 1, the electronic circuit 1000a of FIG. 10, and the electronic circuit 1000b of FIG. 11 for the purpose of converting a voltage.

The main processor 2600 may control overall operations of the electronic device 2000. The main processor 2600 may control/manage operations of components of the electronic device 2000. The main processor 2600 may process various operations for the purpose of operating the electronic device 2000. For example, the main processor 2600 may be implemented with a general-purpose processor, a special-purpose processor, or an application processor.

According to an embodiment of the inventive concepts, an offset voltage that is generated by active elements included in an electronic circuit may be canceled out, and thus, a voltage having an accurate level may be output from the electronic circuit.

While the inventive concepts have been described with reference to example embodiments thereof, it will be apparent to those of ordinary skill in the art that various changes and modifications may be made thereto without departing from the spirit and scope of the inventive concept as set forth in the following claims.

What is claimed is:

1. An electronic circuit, comprising:
a reference voltage generating circuit configured to generated a second reference voltage and a third reference voltage from a first reference voltage, the reference voltage generating circuit including a first voltage divider configured to obtain the second reference voltage by dividing the first reference voltage by a first ratio;
a feedback circuit configured to generate an input voltage from an output voltage, the feedback circuit includes a second voltage divider configured to obtain the input voltage by dividing the output voltage by a second ration, the output voltage being from a functional circuit block;
a first amplifying circuit configured to generate a first compensation voltage based on the second reference voltage, a control voltage, and the input voltage; and
a second amplifying circuit configured to generate the control voltage by performing an auto zeroing operation based on the output voltage, and the third reference voltage, wherein
the second reference voltage than the first reference voltage.

2. The electronic circuit of claim 1, wherein the second reference voltage is the first ratio of the first reference voltage.

3. The electronic circuit of claim 2, wherein the input voltage is the second ratio of the output voltage.

4. The electronic circuit of claim 3, wherein the first ratio is proportional to the second ratio.

5. The electronic circuit of claim 3, wherein the first ratio is the same as the second ratio.

6. The electronic circuit of claim 1, wherein the input voltage is a ratio of the output voltage.

7. The electronic circuit of claim 1, wherein the third reference voltage is a bypassed voltage from the first reference voltage.

8. The electronic circuit of claim 1, wherein the first ratio is proportional to the second ratio.

9. The electronic circuit of claim 1, wherein the first ratio is same as the second ratio.

10. The electronic circuit of claim 1, wherein the second amplifying circuit is configured to output the control voltage to the functional circuit block.

11. The electronic circuit of claim 1, wherein
the first amplifying circuit is configured to receive the first reference voltage at a first non-inverting terminal, and receive the output voltage at a first inverting terminal; and
the second amplifying circuit is configured to receive the second reference voltage at a second non-inverting terminal, receive the input voltage at a second inverting terminal, and receive the first compensation voltage at a null terminal.

12. The electronic circuit of claim 11, wherein the first amplifying circuit includes a first null non-inverting terminal and a first null inverting terminal, and the first amplifying circuit is configured to receive the third reference voltage at the first null non-inverting terminal; and
the second amplifying circuit includes a second null non-inverting terminal and a second null inverting terminal, and the second amplifying circuit is configured to receive the first compensation voltage at the second null non-inverting terminal, and receive a fourth reference voltage at the second null inverting terminal.

13. The electronic circuit of claim 1, further comprising:
a switching architecture configured to, in a first operation, apply the output voltage to a non-inverting terminal and an inverting terminal of the first amplifying circuit, and connect an output of the first amplifying circuit to a null inverting terminal of the second amplifying circuit; and
the switching architecture configured to, in a second operation, apply the output voltage to the inverting terminal of the first amplifying circuit, apply the first reference voltage to the non-inverting terminal of the first amplifying circuit, disconnect the output of the first amplifying circuit from the null inverting terminal of the first amplifying circuit, and apply the output of the first amplifying circuit to a null non-inverting terminal of the second amplifying circuit.

14. The electronic circuit of claim 13, further comprising:
a first charge storing circuit connected to the null non-inverting terminal of the second amplifying circuit;
a second charge storing circuit connected to the null inverting terminal of the second amplifying circuit;
a third charge storing circuit connected to the null non-inverting terminal of the first amplifying circuit; and
a fourth charge storing circuit connected to the null inverting terminal of the first amplifying circuit.

15. The electronic circuit of claim 14, wherein
the switching architecture is configured to, in the first operation, apply third reference voltage to the null non-inverting terminal of the first amplifying circuit; and
the switching architecture is configured to, in the second operation, apply a fourth reference voltage to the null inverting terminal of the second amplifying circuit.

16. The electronic circuit of claim 15, wherein the fourth reference voltage is a same as the third reference voltage.

17. The electronic circuit of claim 15, further comprising:
a first divider circuit configured to divide the first reference voltage by a first ratio to obtain the second reference voltage; and
a second divider circuit configured to divide the output voltage by a second ratio to obtain the input voltage.

18. The electronic circuit of claim 17, wherein the first ratio is proportional to the second ratio.

19. An electronic circuit, comprising:
a first amplifying circuit configured to generate a first compensation voltage based on a first reference voltage and an output voltage, the output voltage being from a functional circuit block;
a second amplifying circuit configured to generate a control voltage based on an input voltage, a second reference voltage and the first compensation voltage, the second reference voltage being different than the first reference voltage; and wherein
the first amplifying circuit is configured to receive the first reference voltage at a first non-inverting terminal, and receive the output voltage at a first inverting terminal;
the second amplifying circuit is configured to receive the second reference voltage at a second non-inverting terminal, and receive the input voltage at a second inverting terminal;
the first amplifying circuit includes a first null non-inverting terminal and a first null inverting terminal, and the first amplifying circuit is configured to receive a third reference voltage at the first null non-inverting terminal; and
the second amplifying circuit includes a second null non-inverting terminal and a second null inverting terminal, and the second amplifying circuit is configured to receive the first compensation voltage at the second null non-inverting terminal, and receive a fourth reference voltage at the second null inverting terminal, and the fourth reference voltage is same as the third reference voltage.

20. An electronic circuit, comprising:
a first amplifying circuit configured to generate a first compensation voltage based on a first reference voltage and an output voltage, the output voltage being from a functional circuit block;
a second amplifying circuit configured to generate a control voltage based on an input voltage, a second reference voltage and the first compensation voltage, the second reference voltage being different than the first reference voltage;
a switching architecture configured to, in a first operation, apply the output voltage to a non-inverting terminal and an inverting terminal of the first amplifying circuit, apply a third reference voltage to a null non-inverting terminal of the first amplifying circuit, and connect an output of the first amplifying circuit to a null inverting terminal of the second amplifying circuit;
the switching architecture configured to, in a second operation, apply the output voltage to the inverting terminal of the first amplifying circuit, apply the first reference voltage to the non-inverting terminal of the first amplifying circuit, disconnect the output of the first amplifying circuit from a null inverting terminal of the first amplifying circuit, apply the output of the first amplifying circuit to a null non-inverting terminal of the second amplifying circuit, and apply a fourth reference voltage to the null inverting terminal of the second amplifying circuit;
a first charge storing circuit connected to the null non-inverting terminal of the second amplifying circuit;
a second charge storing circuit connected to the null inverting terminal of the second amplifying circuit;
a third charge storing circuit connected to the null non-inverting terminal of the first amplifying circuit;
a fourth charge storing circuit connected to the null inverting terminal of the first amplifying circuit;
a first divider circuit configured to divide the first reference voltage by a first ratio to obtain the second reference voltage; and
a second divider circuit configured to divide the output voltage by a second ratio to obtain the input voltage, the first ratio is same as the second ratio.

* * * * *